(12) United States Patent
Subramaniam et al.

(10) Patent No.: US 8,150,725 B2
(45) Date of Patent: Apr. 3, 2012

(54) METHOD AND SYSTEM OF MULTIDIMENSIONAL ATTRIBUTION ANALYSIS OF TELECOMMUNICATION SERVICES DISTRIBUTION

(75) Inventors: Ganesh Subramaniam, Bridgewater, NJ (US); Samuel Epstein, Madison, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 670 days.

(21) Appl. No.: 12/262,703

(22) Filed: Oct. 31, 2008

(65) Prior Publication Data

US 2010/0114636 A1 May 6, 2010

(51) Int. Cl.
G06Q 10/00 (2012.01)
G06Q 20/00 (2012.01)
G06Q 30/00 (2012.01)

(52) U.S. Cl. .................. 705/7.35; 705/7.29; 705/63

(58) Field of Classification Search .................. None
See application file for complete search history.

(56) References Cited

U.S. PATENT DOCUMENTS

| | | | |
|---|---|---|---|
| 6,073,108 A | 6/2000 | Peterson | |
| 6,249,768 B1 | 6/2001 | Tulskie, Jr. et al. | |
| 6,289,317 B1 | 9/2001 | Peterson | |
| 6,714,947 B2 | 3/2004 | Fa | |
| 6,826,541 B1 | 11/2004 | Johnston et al. | |
| 7,246,091 B1 | 7/2007 | Menchero | |
| 7,249,079 B1 | 7/2007 | Menchero | |
| 7,249,082 B2 | 7/2007 | Menchero | |
| 7,844,486 B2* | 11/2010 | Benad et al. | 705/7.11 |
| 7,904,355 B1* | 3/2011 | Johnson | 705/30 |
| 2002/0082991 A1* | 6/2002 | Friedman et al. | 705/40 |
| 2005/0065805 A1* | 3/2005 | Moharram | 705/1 |
| 2006/0173777 A1* | 8/2006 | Torres et al. | 705/40 |
| 2006/0287950 A1* | 12/2006 | Steinberg et al. | 705/39 |
| 2008/0033859 A1* | 2/2008 | Olsen | 705/36 R |
| 2008/0091483 A1* | 4/2008 | Blouin et al. | 705/7 |
| 2009/0125409 A1* | 5/2009 | Barton | 705/26 |
| 2010/0057510 A1* | 3/2010 | Stevens et al. | 705/7 |
| 2010/0153172 A1* | 6/2010 | Mota | 705/10 |

OTHER PUBLICATIONS

Vanston et al. "Technology Forecasting for Telecommunications" (2004) (http://www.tfi.com/pubs/w/pdf/telektronikk_peer.pdf).*

(Continued)

*Primary Examiner* — Lynda Jasmin
*Assistant Examiner* — Sujay Koneru
(74) *Attorney, Agent, or Firm* — Hoffmann & Baron, LLP (57) ABSTRACT

Embodiments are directed to a method, medium, and system for generating a distribution attribution value to analyze distribution of telecommunications services. The method including compiling values for at least three variable elements associated with the distribution of telecommunication services. A first total value being defined as a product of first element values associated with the at least three variable elements. A second total value being defined as a product of second element values associated with the at least three variable elements. The method also including generating an attribution value representing an amount of influence at least one of the at least three variable elements has on a difference between the first and the second total values. The attribution value being calculated using the first and second total values. Also, the attribution value being adapted to at least one of verify and adjust the distribution of telecommunication services.

14 Claims, 5 Drawing Sheets

OTHER PUBLICATIONS

Lim et al. "The late take-off phenomenon in the diffusion of telecommunication services: netowrk effect and the criticial mass" (2003) Information Economics and Policy.*

Carino "Combining Attribution Effects Over Time" (Summer 1999) The Journal of Performance Measurement, p. 5-14.*

Schoder "Forecasting the success of telecommunication services in the presence of network effects" (2000) Information Economics and Policy 12, p. 181-200.*

* cited by examiner

METHOD AND SYSTEM OF MULTIDIMENSIONAL ATTRIBUTION ANALYSIS OF TELECOMMUNICATION SERVICES DISTRIBUTION

BACKGROUND OF THE INVENTION

1. Field of the Invention

The present invention generally relates to the field of product distribution attribution analysis. Particularly, to the multidimensional analysis of the distribution of telecommunication products and services.

2. Brief Description of the Related Art

When products and/or services are delivered through a complex distribution network, it is generally difficult to isolate and quantify the influence of individual elements of that network on the overall process. For example, in the telecommunications industry, there are many sources that contribute to the cumulative expense or revenue involved in distributing a particular product/service. These sources include all quantifiable elements that drive how products are distributed amongst jurisdictions and suppliers. These sources act as variables that contribute to the efficiency and profitability of each individual product/service. Due to the nested nature of these variables, it is generally difficult to determine or even estimate how much any particular source contributed to or detracted from the distribution expense or revenue of that product. This uncertainty also makes it difficult to project future expenses, incomes or other quantities related to the business that are directly attributable to changes in any group of driving elements.

Currently, no standardized systematic methodology exists for attributing or quantifying how much an individual source influences product distribution. Contemporary methods of attributing source variation only analyze two sources of variation at a time, even though more than two sources need to be considered for most business applications. Such a technique, known as a two-dimensional analysis, provides a very flat and incomplete, and potentially misleading view of the real sources driving change within a product distribution scheme. Often, analysts will use a two-dimensional attribution analysis and add ad hoc non-mathematical non-reproducible procedures to make inferences beyond the initial two dimensions. Such practices typically yield results that are dependent on the order of the sources selected for the initial analysis and are unable to fully explain the variation at issue. Moreover, results from such ad hoc processes lead to confounding of attributions from one source to another, leading to results that are difficult to interpret or rely upon. Often the influence of one or more sources will be overstated, while other source influences will be understated. Also, improper "aliasing" occurs when not all sources are taken into account and the influence from the missing source(s) is attributed to a defined source, leading to further inaccuracies. Hence, current methods are more akin to an art form than a repeatable, mathematically supported analysis.

There is therefore a need for a method of and system for generating an attribution value for analyzing a complex product distribution model. Such a method and system preferably provides a mathematical construct for attributions that explains all variables associated with the distribution of products. Additionally, the method and system preferably takes into account the cancellation or interaction of variables, which can often alter the results of an analysis. Further, contrary to current ad hoc methods, a method and system of attribution valuation is needed that is not time consuming and is reproducible in a reliable manner.

Other embodiments and features of the present invention will become apparent from the following detailed description considered in conjunction with the accompanying drawings. It is to be understood, however, that the drawings are designed as an illustration only and not as a definition of the limits of the invention.

SUMMARY OF THE INVENTION

Preferred embodiments are directed to a method, medium, and system, which can include a computing device, for generating a distribution attribution value to analyze distribution of telecommunications services. The method including compiling values for at least three variable elements associated with the distribution of telecommunication services. A first total value being defined as a product of first element values associated with the at least three variable elements. A second total value being defined as a product of second element values associated with the at least three variable elements. The method also including generating an attribution value representing an amount of influence at least one of the at least three variable elements has on a difference between the first and the second total values. The attribution value being calculated using the first and second total values. Also, the attribution value being adapted to at least one of verify and adjust the distribution of telecommunication services.

Another aspect of the preferred embodiments includes generating a total attribution value using:

$$A_T = \sum_{j=1}^{P} A_j$$

wherein P represents a number of profiles resulting from the at least three variable elements and j represents a specific profile from 1 to P.

Additionally, an attribution value for a specific profile can be determined using:

$$A_j = (u_1 u_2 \ldots u_{n-1})\Delta u_n + (u_1 u_2 \ldots u_{n-2} u_n)\Delta u_{n-1} + \ldots + (u_1 u_3 \ldots u_n)\Delta u_2 + (u_2 \ldots u_n)\Delta u_1 + I$$

where $u_i$ represents a value corresponding to individual variable elements and the subscript i ranges from 1 to n, where n represents the total number of variable elements, and I represents the attribution value due to an interaction of the n variables.

Additionally, the attribution value for the interaction of the n variables in a specific profile can be determined using:

$$I = u_1 u_2 \ldots u_{n-2}\Delta u_{n-1}\Delta u_n + u_1 u_2 \ldots u_{n-3}\Delta u_{n-2}\Delta u_{n-1} u_n + \ldots +$$
$$u_1 \Delta u_2 \Delta u_3 u_4 \ldots u_n + \Delta u_1 \Delta u_2 u_3 \ldots u_n + u_1 u_2 \ldots u_{n-3}\Delta u_{n-2}\Delta u_{n-1}\Delta u_n +$$
$$u_1 u_2 \ldots u_{n-4}\Delta u_{n-3}\Delta u_{n-2}\Delta u_{n-1} u_n + \ldots + u_1 \Delta u_2 \Delta u_3 \Delta u_4 u_5 \ldots u_n +$$
$$\Delta u_1 \Delta u_2 \Delta u_3 u_4 \ldots u_n + \ldots + \Delta u_1 \Delta u_2 \ldots \Delta u_n.$$

As yet a further aspect of the present invention, the at least three variable elements can include at least one of a number of units, a type of product, a jurisdiction, a supplier and a unit cost. Also, the at least one of the first and second total values represents at least one of forecast distribution expenses, realized distribution expenses, and distribution expenses and revenues in different time periods. Further, the generation of an attribution value can includes all the at least three variable elements.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

The invention relates to a method of and system for accurately attributing a weight or value (an attribution value) to each one of the dimensions that drive the distribution of a product and/or service. The invention is particularly useful to a number of telecommunications applications, including the multidimensional analysis of the distribution of telecommunication products and services, expense and revenue analysis associated with product distribution and other business problems, as well as network traffic analysis. In each of these applications, quantities (i.e. minutes, products, dollars) are distributed among a multidimensional set of entities (network nodes, rate elements, customers, business jurisdictions, geographies etc.) under a variety of circumstances (i.e. different time periods, alternative planning scenarios, planned vs. actual achievement, etc.). Business decision making necessitates attributing to driving entities/dimension(s) respective contributions to the total outcome. These attribution values enable attainment of an understanding of factors causing and explaining the overall change in quantities distributed in each of the circumstances. Furthermore, these attributions must be mathematically based to be reproducible, fully explain changed impacts, and yield consistently comparable results in successive uses.

One embodiment of the invention applies this method and system to the analysis of expenses and/or income associated with the distribution of telecommunication services. The attribution values in accordance with the present invention are determined through an analysis of two sets of element values, where each set of values corresponds to a different business scenario. The method uses an algorithm for attributing a value to each of the variables or elements influencing the difference between the outcomes of two business scenarios. The elements include all the sources driving a specific composite result.

The method and system assigns a variable to each element. For example, $u_1, u_2 \ldots u_n$ will represent n variables. Accordingly, a multiplicative model of those variables is represented as $y = u_1 u_2 \ldots u_n$. Further, $\Delta u_i$ will represent the change in variable $u_i$. Note that $\Delta u_i$ can be positive (representing an increase in the value of the variable) or negative (representing a decrease therein) depending on the nature of the change associated with variable $u_i$. Thus, in accordance with the present invention, the attribution due to a particular variable $u_i$ is represented by the product of the terms $u_1 u_2 \ldots u_{i-1} \Delta u_i u_{i+1} \ldots u_n$. Also, the total attribution $A_T$ for all profiles due to all n variables or the n main effects is given by the following:

$$A_T = \sum_{j=1}^{P} A_j. \tag{1a}$$

where P is the number of profiles or combinations of variables being analyzed and $A_j$ is the contribution for a given profile j.

$$A_j = (u_1 u_2 \ldots u_{n-1}) \Delta u_n + (u_1 u_2 \ldots u_{n-2} u_n) \Delta u_{n-1} + \ldots + (u_1 u_3 \ldots u_n) \Delta u_2 + (u_2 \ldots u_n) \Delta u_1 + I. \tag{1b}$$

where the values of the variables $u_i$ pertain to profile j and I is the attribution due to the interaction of the n variables for profile j and is calculated by the following:

$$I = u_1 u_2 \ldots u_{n-2} \Delta u_{n-1} \Delta u_n + \\ u_1 u_2 \ldots u_{n-3} \Delta u_{n-2} \Delta u_{n-1} u_n + \ldots + u_1 \Delta u_2 \Delta u_3 u_4 \ldots u_n + \\ \Delta u_1 \Delta u_2 u_3 \ldots u_n + u_1 u_2 \ldots u_{n-3} \Delta u_{n-2} \Delta u_{n-1} \Delta u_n + \\ u_1 u_2 \ldots u_{n-4} \Delta u_{n-3} \Delta u_{n-2} \Delta u_{n-1} u_n + \ldots + u_1 \Delta u_2 \Delta u_3 \Delta u_4 u_5 \ldots u_n + \\ \Delta u_1 \Delta u_2 \Delta u_3 u_4 \ldots u_n + \ldots + \Delta u_1 \Delta u_2 \ldots \Delta u_n. \tag{1c}$$

The first two lines of the interaction effect formula above (1c) take into account the product of the change in pairs of variables. The ellipsis between the plus symbols (+ . . . +; starting at the end of lines 1, 3 and 4 in formula (1c) indicates that the formula must be expanded to represent changes in all combinations of variables. The last added term on the second line as well as the third and fourth lines take into account the product of the change in three variables. Once again, all combinations of three variable sets must be taken into account. The ellipsis at the end of the forth line represents the inclusion in the formula of the product of the change in increasing numbers of variables up to "n". Thus, the last term takes into account the product of the change in all "n" variables.

Alternatively, formula 1b and 1c can be expressed as follows:

$$A_j = \frac{(u_1 u_2 \ldots u_n) \Delta u_n}{u_n} + \\ \frac{(u_1 u_2 \ldots u_n) \Delta u_{n-1}}{u_{n-1}} + \ldots + \frac{(u_1 u_2 \ldots u_n) \Delta u_1}{u_1} + I. \tag{1b'}$$

and

-continued $$I = \frac{(u_1 u_2 \ldots u_n)\Delta u_{n-1}\Delta u_n}{u_{n-1}u_n} + \frac{(u_1 u_2 \ldots u_n)\Delta u_{n-2}\Delta u_{n-1}}{u_{n-2}u_{n-1}} + \ldots + \\ \frac{(u_1 u_2 \ldots u_n)\Delta u_1 \Delta u_2}{u_1 u_2} + \frac{(u_1 u_2 \ldots u_n)\Delta u_{n-2}\Delta u_{n-1}\Delta u_n}{u_{n-2}u_{n-1}u_n} + \\ \frac{(u_1 u_2 \ldots u_n)\Delta u_{n-3}\Delta u_{n-2}\Delta u_{n-1}}{u_{n-3}u_{n-2}u_{n-1}} + \ldots + \\ \frac{(u_1 u_2 \ldots u_n)\Delta u_1\Delta u_2\Delta u_3}{u_1 u_2 u_3} + \ldots + \frac{(u_1 u_2 \ldots u_n)\Delta u_1 \Delta u_2 \ldots \Delta u_n}{u_1 u_2 \ldots u_n}.$$ (1c')

The alternative formulas 1b' and 1c' show than in each group of terms being added in the formula, the value of the variable(s) associated with any change variable(s) is/are cancelled out of that group in the equation. For example, the first group of terms being added in formula 1b' includes only one change variable $\Delta u_n$, accordingly $u_n$ is included in the denominator, which in effect cancels it out from the entire set of variable values $(u_1 u_2 \ldots u_n)$ in that group.

For n=2, the total attribution equals:

$$u_2\Delta u_1 + u_1\Delta u_2 + \Delta u_1\Delta u_2$$ (1d).

where the attribution due to $u_1$ is $u_2\Delta u_1$ and the attribution due to $u_2$ is $u_1\Delta u_2$. There is only one interaction term namely $\Delta u_1\Delta u_2$.

For n=3, the total attribution equals:

$$u_2 u_3\Delta u_1 + u_1 u_3\Delta u_2 + u_1 u_2\Delta u_3 + u_1\Delta u_2\Delta u_3 + u_2\Delta u_3\Delta u_1 + \\ u_3\Delta u_1\Delta u_2 + \Delta u_1\Delta u_2\Delta u_3$$ (1e).

where the attributions due to $u_1$, $u_2$ and $u_3$ are given by $u_2 u_3\Delta u_1$, $u_1 u_3\Delta u_2$ and $u_1 u_2\Delta u_3$ respectively. The attribution due to interaction is the sum of the following terms:

$$u_1\Delta u_2\Delta u_3 + u_2\Delta u_3\Delta u_1 + u_3\Delta u_1\Delta u_2 + \Delta u_1\Delta u_2\Delta u_3.$$

The current invention is particularly suited for the analysis of product distribution scenarios having any number of source variables in a multiplicative model. Thus, it is presumed in all the examples illustrated herein that the product is fully distributed. In other words, the total volume gets distributed through all the branches of the distribution tree. The method and system can be equally applied to an attribution analysis using only two dimensions or more (i.e., any number of source variables). Thus, for illustrative purposes the first example described below relates to a two-dimensional case. Further examples considering additional sources follow.

Consider the total expense E involved in distributing a product. In a simplistic scenario, the expense E can be driven or determined by only two variable elements. This is considered a two-dimensional case, because only two elements influence the total value. It is important that the elements be multiplicative, so that the product of the appropriately expressed values of each variable equals the total for a given scenario. A two-dimensional case can be visualized with a graph using horizontal and vertical coordinates (i.e., an x and y axis), as shown in FIGS. 1-4. In this example, the two variables are the amount A of product sold and the unit cost C per product. Accordingly, the area on the graph within each box defined by a particular amount A and cost C represents the expense E associated with those values. In this way expense E can be calculated by:

$$E = A \times C = A * C$$ (2).

By superimposing two sets of values from different expense scenarios $E_1$, $E_2$, it is illustrated how each source A and C, as well as the potential interaction between A and C, will influence a change in expense ($\Delta E = E_2 - E_1$). FIGS. 1-4 particularly represent four different scenarios of two-dimensional cases. Each of the FIGS. 1-4 represent a different combination of variables, with either a positive or negative change in the amount A or cost C ($\Delta A = A_2 - A_1$; $\Delta C = C_2 - C_1$).

Figure 1:
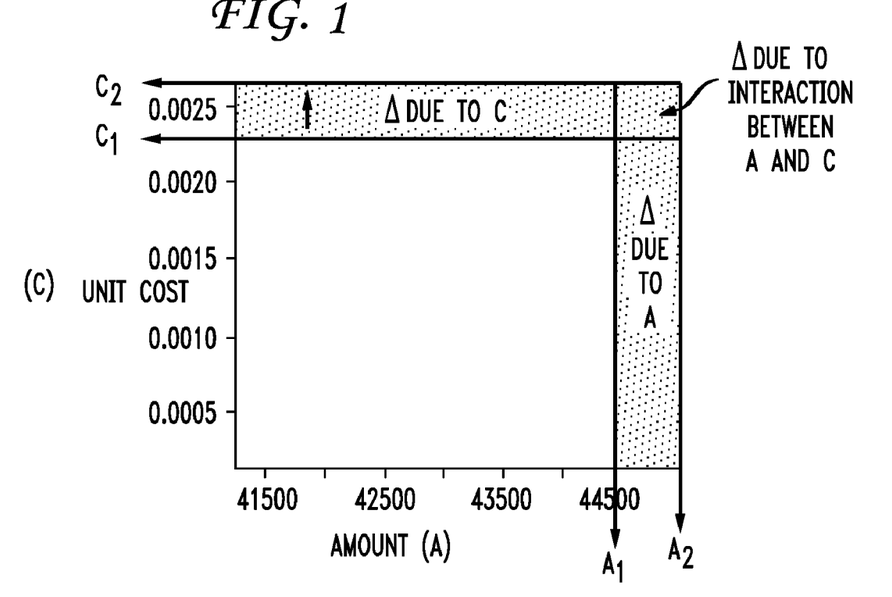
FIG. 1 is an illustration of a two-dimensional model in accordance with the present invention.

FIG. 1 illustrates a scenario where the change in amount $\Delta A$ and the change in cost $\Delta C$ are both positive. In this example, the vertical axis represents unit costs C and the horizontal axis represents the amount A or number of minutes sold by a telecommunications provider. The areas in the boxes on the graph relate to the expense associated with a particular amount A and cost C. In this way, the central box with no shading (bounded by $A_1$, $C_1$ and zero values for both variables) represents the value of the first expense $E_1$. The overall larger box that includes the central box and the outer gray shaded areas (bounded by $A_2$, $C_2$ and zero values for both variables) represents the second expense $E_2$. The gray shaded box on the right side of the graph (bounded by $A_2$, $A_1$, $C_1$ and the zero value for C) represents the change in expense attributable to the change in A. The gray shaded box along the topside of the graph (bounded by $C_2$, $C_1$, $A_1$ and the zero value for A) represents the change in expense attributable to the change in C. The gray shaded box in the top-right corner of the graph (bounded by $A_2$, $A_1$, $C_2$ and $C_1$) represents the change in expense attributable to the interaction between changes in A and C.

Accordingly, a change in expense $\Delta E$ can be calculated in accordance with:

$$\Delta E = E_2 - E_1$$ (3)

Further, equation (2) can be manipulated, in accordance with generally understood mathematical principles as follows:

$$\Delta E = (A_2 C_2) - (A_1 C_1)$$ (4)
$$= ((\Delta A + A_1)(\Delta C + C_1)) - (A_1 C_1)$$
$$= (\Delta A \Delta C + \Delta A C_1 + A_1 \Delta C + A_1 C_1) - A_1 C_1$$
$$= \underbrace{A_1 \Delta C}_{(5a)} + \underbrace{C_1 \Delta A}_{(5b)} + \underbrace{\Delta A \Delta C}_{(5c)}.$$

A comparison of the above equations with the illustration of FIG. 1, shows that the portion of the equation labeled (5a) represents the change in expense attributed to the change in C; the portion labeled (5b) represents the change in expense attributed to the change in A and the portion labeled (5c) represents the change in expense attributed to the interaction between the changes in A and C. Accordingly:

(5a) is the attribution value due to the change in C;
(5b) is the attribution value due to the change in A; and
(5c) is the attribution value due to the interaction between sources of change.

Figure 2:
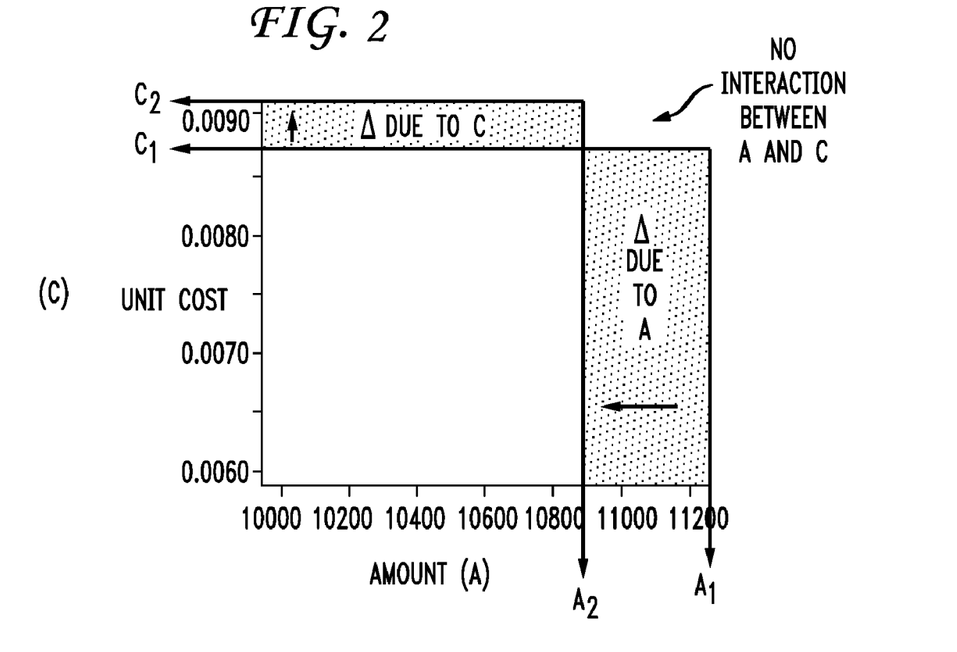
FIG. 2 is an illustration of another two-dimensional model in accordance with the present invention.

Similarly, FIG. 2 illustrates a scenario where the change in amount $\Delta A$ is negative and the change in cost $\Delta C$ is positive. Note the gray shaded box on the right side of the graph (bounded by $A_2$, $A_1$, $C_1$ and the zero value for C) represents a negative value and reduction from the initial expense $E_1$. Similarly, the gray shaded box at the top of the figure reflects an increase in expense $E_1$. Thus, taking into account the direction of change for elements A and C, the change in expense $\Delta E$ can be represented by:

$$\Delta E = (A_2 C_2) - (A_1 C_1) \text{ as in (4)}$$
$$\Delta E = (A_1 - \Delta A)(C_1 + \Delta C) - (A_1 C_1)$$

-continued $$\Delta E = \underbrace{A_1 \Delta C}_{(6a)} - \underbrace{C_1 \Delta A}_{(6b)} - \underbrace{\Delta C \Delta A}_{(6c)}$$

Note that the negative term 6c removes the effect of the interaction between the change in A and the change in C from the term 6a. Thus, where the amount A decreases and the cost C increases, the attribution value due to C can be determined by formula (6a) and the attribution value due to A can be determined by formula (6b).

Figure 3:
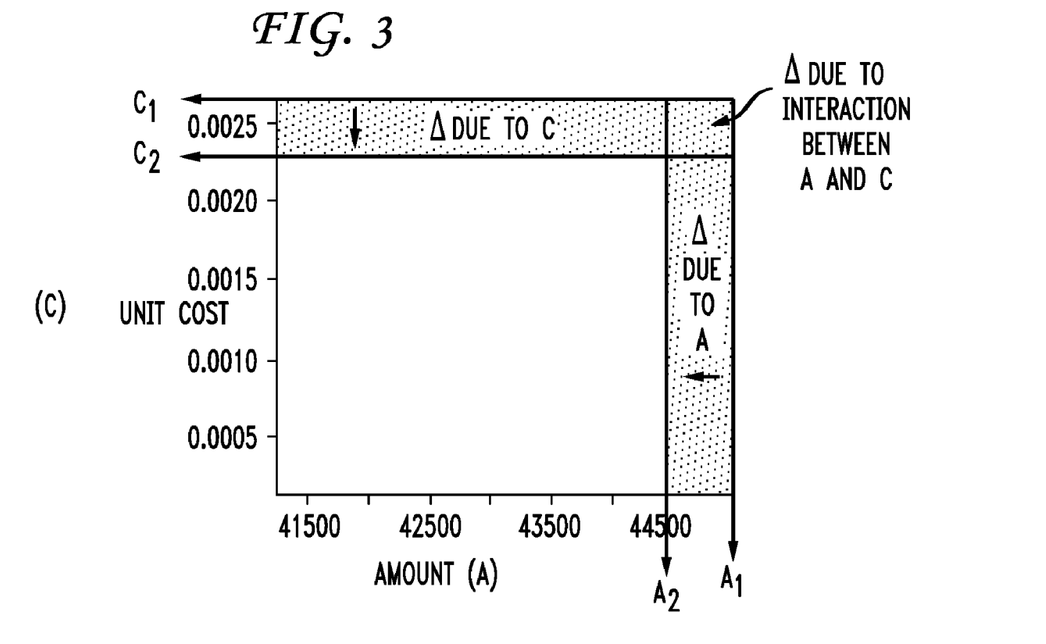
FIG. 3 is an illustration of another two-dimensional model in accordance with the present invention.

FIG. 3 illustrates a scenario where the change in amount $\Delta A$ and the change in cost $\Delta C$ are both negative. In this scenario the boxes are somewhat reversed from the first scenario, in FIG. 1. The central and largest box with no shading (bounded by $A_2$, $C_2$ and zero values for both variables) represents the value of the second expense $E_2$. The overall larger box that includes the central box and the outer gray shaded areas (bounded by $A_1$, $C_1$ and zero values for both variables) represents the first expense $E_1$. The gray shaded box on the right side of the graph (bounded by $A_2$, $A_1$, $C_2$ and the zero value for C) represents the change in expense attributable to A. The gray shaded box along the top side of the graph (bounded by $C_2$, $C_1$, $A_2$ and the zero value for A) represents the change in expense attributable to C. The gray shaded box in the top-right corner of the graph (bounded by $A_2$, $A_1$, $C_2$ and $C_1$) represents the change in expense attributable to the interaction between A and C. Thus, taking into account the direction of change for elements A and C, the change in expense $\Delta E$ can be represented by:

$$\Delta E = \underbrace{-A_1 \Delta C}_{(7a)} - \underbrace{C_1 \Delta A}_{(7b)} + \underbrace{\Delta A \Delta C}_{(7c)}$$

Thus, where both the amount A and the cost C decrease, the attribution value of the interaction between sources A and C can be determined by formula (7c), the attribution value for A can be determined by formula (7b) and the attribution value for C can be determined by formula (7a).

Figure 4:
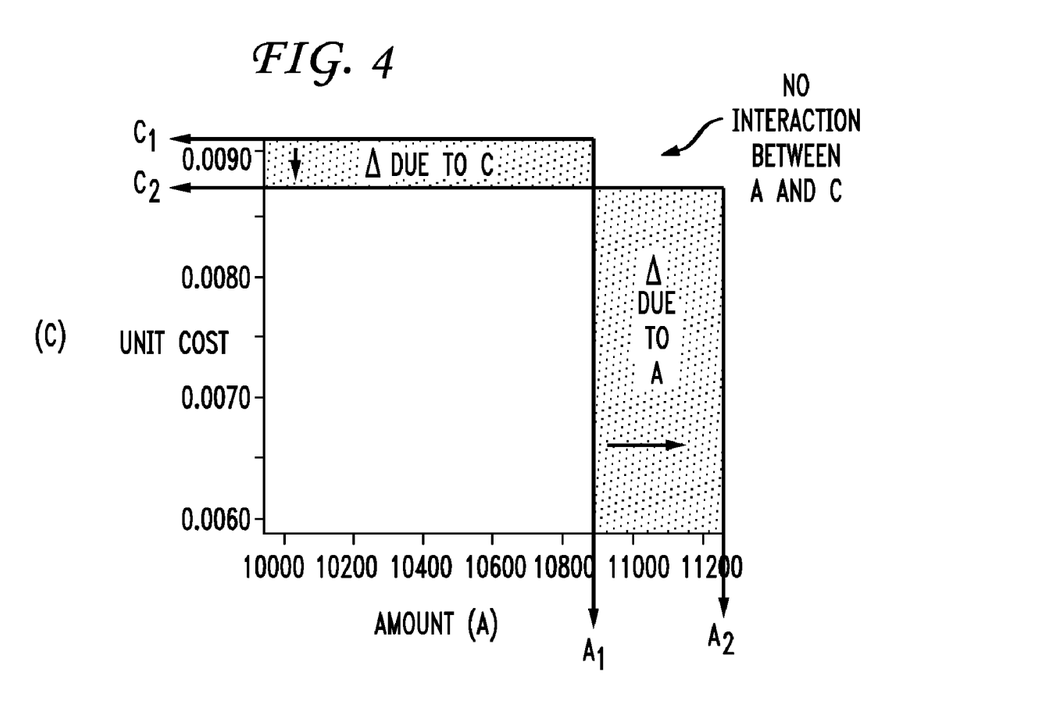
FIG. 4 is an illustration of another two-dimensional model in accordance with the present invention.

FIG. 4 illustrates a scenario where the change in amount $\Delta A$ is positive and the change in cost $\Delta C$ is negative, which is the opposite of FIG. 2. Here note the gray shaded box on along the top of the graph (bounded by $C_1$, $C_2$, $A_1$ and the zero value for A) represents a negative value and subtracts from the initial expense $E_1$. Also, in this scenario there is no interaction between elements A and C. Thus, taking into account the direction of change for elements A and C, the change in expense $\Delta E$ can be represented by:

$$\Delta E = \underbrace{-A_1 \Delta C}_{(8a)} + \underbrace{C_1 \Delta A}_{(8b)} - \underbrace{\Delta A \Delta C}_{(8c)}$$

Figure 5:
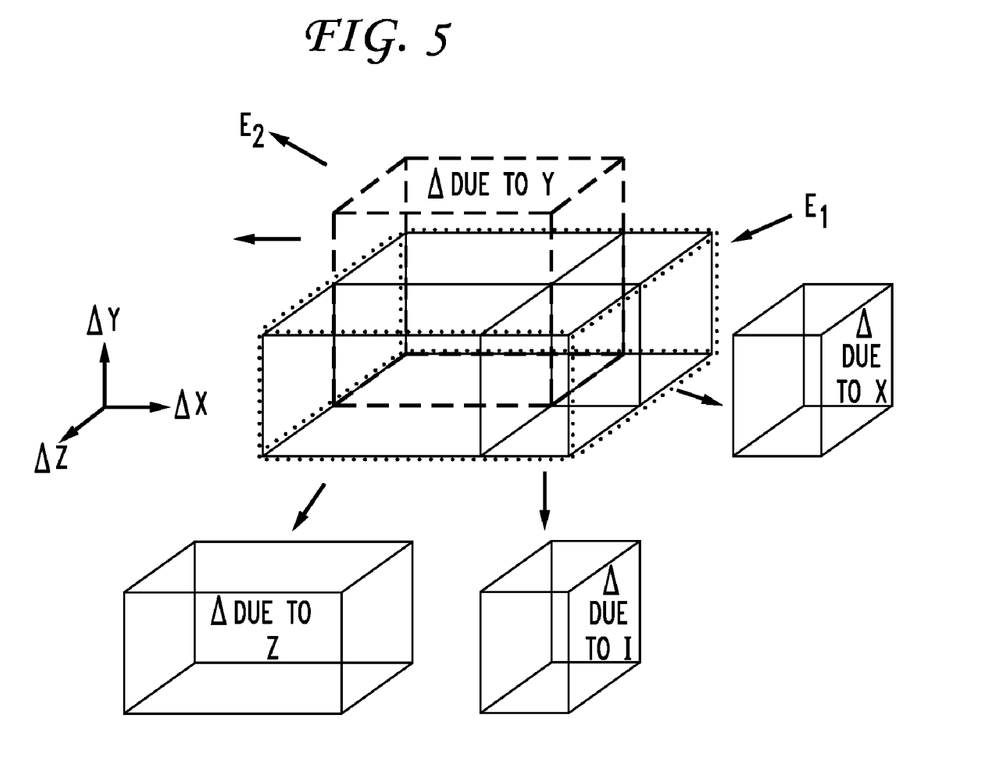
FIG. 5 is an illustration of a three-dimensional model in accordance with the present invention.

Thus, where the amount A increases and the cost C decreases, the attribution value due to C can be determined by formula (8a), the attribution value due to A can be determined by formula (8b) and the attribution value of the interaction between sources A and C can be determined by formula (8c), While the above scenarios considered only two multiplicative elements, A and C, driving the total value E, actual business models generally take into account more than two such sources/drivers. However, both the formulaic and graphical representations of those elements and their interaction become more lengthy and cumbersome with each added dimension. Take for example a three-dimensional case as illustrated in FIG. 5, showing expense E driven by an amount of units X, and to a mix of suppliers (supplier mix) Y with unit cost Z. The supplier mix Y represents the proportion of product distributed through each supplier. Thus, when considering the total expense E, associated with the distribution to all suppliers Y, the value of Y for a given supplier would be some fraction less than one (1) or a percentage less than 100%. Although the illustrative figures herein use percentages, it should be understood that fractions or some other mathematical equivalent can be used. Thus, a three-dimensional case will include attribution values to the three variables X, Y and Z, and interactions of those variables. Those variables can be expressed using the format set forth in formula (1b), namely $u_X$, $u_Y$, $u_Z$ and I. Also, the total attribution in a three-dimensional case (n=3) can be calculated using formula (1e). The number of possible scenarios or combinations for a given mix of n driving variables is determined by $2^n$. Accordingly, where the two-dimensional case had four possible combinations ($2^2$ combinations) of increasing/decreasing values, the three-dimensional case leads to eight ($2^3$) possible combinations as follows:

TABLE 1

| | | Amount (X) | Supp. Mix (Y) | Cost (Z) |
|---|---|---|---|---|
| Scenario | 1 | + | + | + |
| | 2 | − | + | + |
| | 3 | + | − | + |
| | 4 | − | − | + |
| | 5 | + | + | − |
| | 6 | − | + | − |
| | 7 | + | − | − |
| | 8 | − | − | − |

Note:
"+" indicates an increase in value between two different sets of values,
while "−" indicates a decrease in value.

The scenario illustrated in FIG. 5 corresponds to the scenario in row 6 of Table 1, above. As illustrated, in a three-dimensional analysis, the volumes of cubes represent the attributions. The first expense $E_1$ is represented by the cube denoted by dotted lines and the second expense $E_2$ is represented by the cube denoted by dashed lines. The change in amount X is measured along the x-axis, but in this example the change along the x-axis ($\Delta x$) is negative. The change in cost Z is measured along the z-axis ($\Delta z$), and in this example is also negative. The change in supplier mix Y is measured along the y-axis, however in this example the change along the y-axis ($\Delta y$) is positive. Thus, with a three-dimensional representation the change attributable to each of the variables and their interaction is illustrated. The change due to the increase in Y (the attribution of Y) is represented by the volume of the smaller rectangular cube protruding from the top of the cube representing the first expense $E_1$. The change due to the decrease in X and Z (the respective attributions of X and Z) are represented by the volume of the reproduced and separated cubes respectively marked "Δ due to X" and "Δ due to Z". Additionally, the volume of the separated cube marked "Δ due to I" represents the change due to the interaction between elements (the attribution of the interaction elements). The three-dimensional case, illustrated in FIG. 5, demonstrates how complex things get as additional variables are added to the equations. In fact, graphical multi-dimensional representations become inappropriate beyond three (3) dimensions. It is for this reason that the mathematical techniques of the present invention are advantageous.

Figure 6:
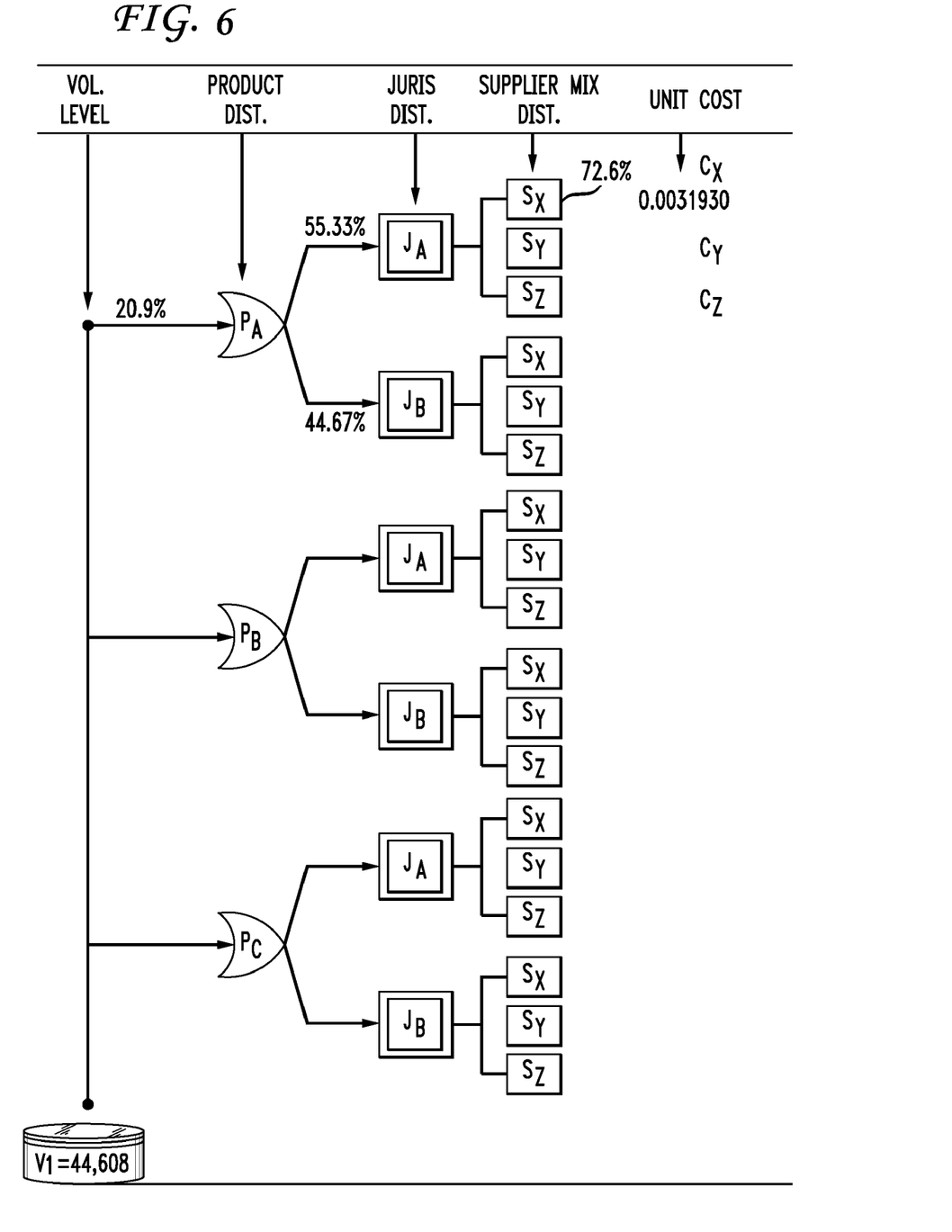
FIG. 6 is an illustration of a product distribution tree scenario in accordance with the present invention.
Figure 7:
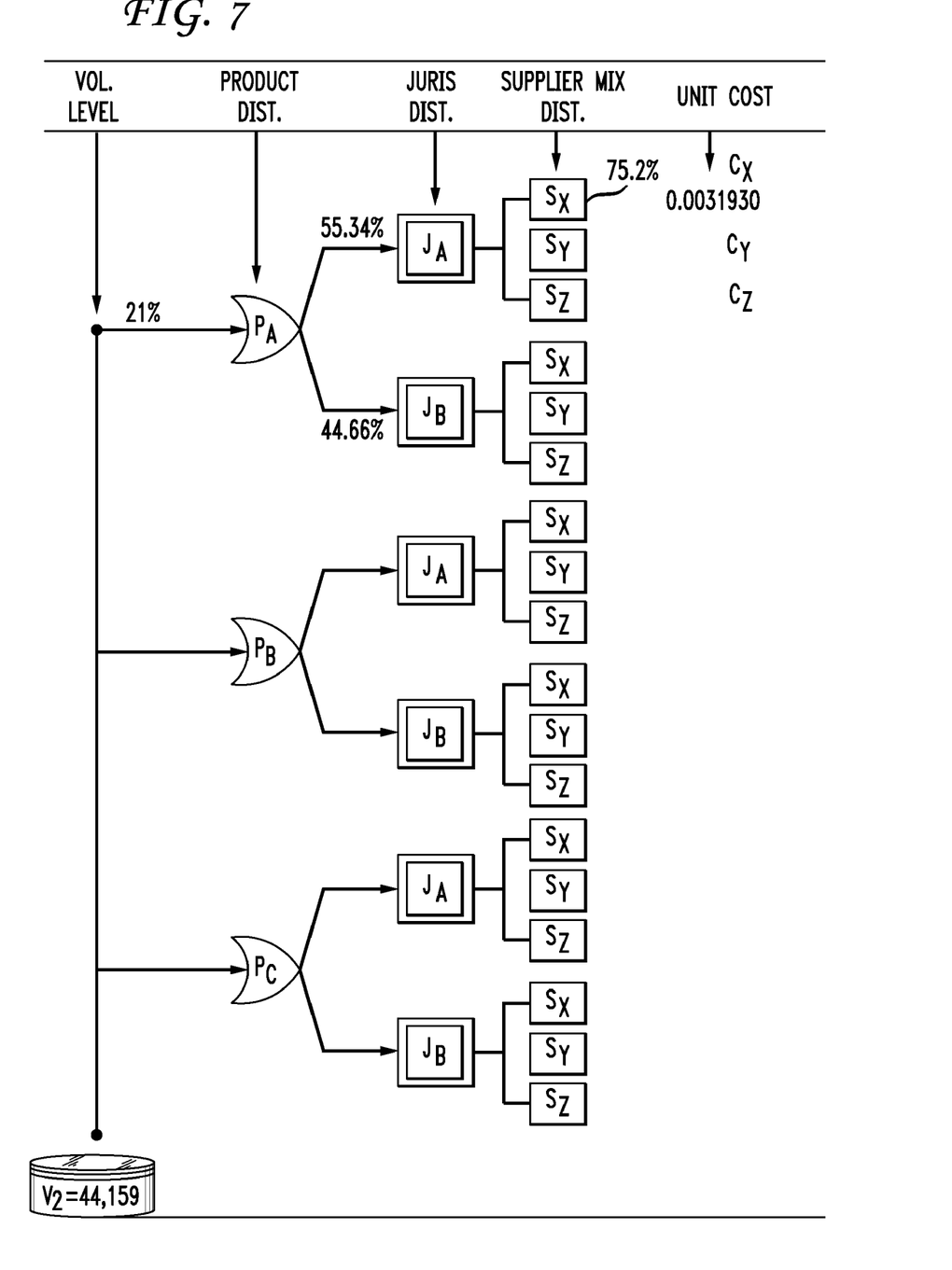
FIG. 7 is an illustration of another product distribution tree scenario in accordance with the present invention.

The total distributed amounts or values $V_1$, $V_2$ driven by their constituent sources can be represented by a product distribution tree, as illustrated in FIGS. 6 and 7. Each point where a branch divides on the tree (including the bases $V_1$, $V_2$) represents a variable driving the total values $E_1$, $E_2$. The elements at the tips of the final branches are also considered drivers, but additionally contain units of measure (i.e., cost per unit) of the total values $E_1$, $E_2$ being analyzed. The element at the base of the tree $V_1$, $V_2$ represents total units to be distributed among all profiles in a given scenario. A product distribution profile follows a single branch of the tree from its base to the tip. Each product distribution profile is defined by the multiplication of the value of all the properly expressed source variables from the base to the tip of a branch. Thus, variables that are nested within other variables are expressed as percentages relative to the subtotal that their total value represents. Subtotals are given by the respective nodes immediately to the left of a given set of branches. FIGS. 6 and 7 illustrate values for three product distribution profiles at the base of the trees $P_A$, $P_B$, $P_C$). It should be understood that all branches on the tree would have values associated with them. Each attribution value for a product distribution profile will represent the influence each source has on the total values $E_1$, $E_2$. By defining the elements of product distribution in this way, the methodology in accordance with the present invention provides an analysis of all sources contributing to the total value. In other words, there will be no unexplained sources influencing the total expense, income or other value being analyzed.

FIGS. 6 and 7 also illustrate a five-dimensional case suitable for calculating attribution values in accordance with the present invention. In particular, FIGS. 6 and 7 represent the product distribution for telecommunication services in two related scenarios. These five-dimensional scenarios include a value, such as expense E, that is driven by five (5) variable sources, namely an amount V (number of units distributed, indicated in millions ($10^6$) of minutes), the products being distributed (product distribution) P, the jurisdictions in which the products are distributed for each product jurisdictional distribution) J, the mix of suppliers for each jurisdiction (supplier distribution) S, and unit cost from each supplier C (in units of dollars ($) per minute). Using the multiplicative model in accordance with the invention, the expense $E_1$ for a given profile is the product of a select amount $V_1$; product distribution $P_A$, $P_B$, $P_C$; jurisdictional distribution $J_A$, $J_B$; supplier distribution $S_X$, $S_Y$, $S_Z$; and product unit cost $C_X$, $C_Y$, $C_Z$. Thus, a different scenario will likely have different total values $E_1$, $E_2$ which are dependent on the values of particular nested variables in its distribution profile.

Each scenario, such as the two scenarios illustrated in FIGS. 6 and 7, represents a different set of values for the source variables. The source variables are the driving elements which influence the distribution in each case. The method and system of the present invention uses the comparison of two scenarios in order to calculate attribution values that represent the amount of influence each variable has on the change between scenarios. The values $E_1$, $E_2$ from two different scenarios can represent a comparison of actual values from two different points in time, actual measured values versus projected or estimated values, or any combination thereof.

The scenario shown in FIG. 6 represents a distribution tree for an expense $E_1$, having a volume level or amount $V_1$. In this embodiment the amount $V_1$ is associated with a number of minutes of telecommunications services used and/or sold under a select scenario. As shown in FIG. 7, a different scenario can have a different number of minutes used $V_2$. It should be understood that between two scenarios the values for any particular variable (i.e., both amounts $V_1$, $V_2$) can be the same, even though the total values $E_1$, $E_2$ change. This is because the total values $E_1$, $E_2$ are influenced by additional variables.

In FIG. 6, the variables $V_1$, $P_A$, $J_A$, $S_X$, and $C_X$ are all associated with profile 1 of scenario 1. Another profile (profile 2) for the same scenario can be represented by variables $V_1$, $P_A$, $J_A$, $S_Y$, and $C_Y$. Notably, the only different variables between these two profiles are the supplier $S_X$, $S_Y$ and associated unit costs $C_X$, $C_Y$. Thus, every branch for a particular scenario represents a different profile. In contrast, FIG. 7 shows variables $V_2$, $P_A$, $J_A$, $S_X$, and $C_X$ that are once again associated with profile 1, but this time associated with scenario 2.

The product distribution $P_A$, $P_B$, $P_C$ preferably represents the proportion of products being distributed in the network. For example, in the telecommunications industry each product $P_A$, $P_B$, $P_C$ can be representative of the proportion of the number of minutes of use distributed for that particular product. Examples of such products include stand-alone long-distance service, unbundled network services, prepaid calling cards. Another illustrative set of products is switched access, wireless access, reciprocal compensation or other products. The jurisdictional distribution $J_A$, $J_B$ preferably represents the proportion of a particular product being distributed within a particular jurisdiction in the network. Examples of such jurisdictions include interstate, intrastate or international services. The supplier mix $S_X$, $S_Y$, $S_Z$ preferably represents the proportion of a particular product being distributed within a particular jurisdiction for a particular supplier in the network. Examples of such each supplier mix variables include RBOCs, ICOs, CLECs or the body of access providers used by interexchange carriers to originate/terminate calls. The unit cost $C_X$, $C_Y$, $C_Z$ preferably represents the actual cost for a given supplier $S_X$, $S_Y$, $S_Z$. Such unit costs $C_X$, $C_Y$, $C_Z$ can represent look-up tariffs, provider bills and other related costs associated with a particular profile. It should be understood that while specific examples of variable drivers are described above, these examples are provided for illustrative purposes only and are not intended to limit the scope of the present invention. In general, the total units can be distributed among profiles based on any set of hierarchical nested variables.

In comparing the scenarios presented in FIGS. 6 and 7, a comparison can be made among individual profiles for the two scenarios. Thus, using the multiplicative model of the product distribution profiles and the values shown, two different expenses $E_{1-1}$, $E_{1-2}$ are calculated as follows:

Profile 1—Scenario 1
Expenses from Profile 1, Scenario 1=$E_{11}$ $$E_{11} = V_1 P_{A1} J_{A1} S_{x1} C_{x1}$$

$$E_{11} = (44608 \times 10^6 \text{ min.})(0.209)(0.5533)(0.726)$$
$$(0.003193018 \text{ \$/min.})$$

$$E_{11} = \$11,983,316.00 \quad \quad (9a).$$

Profile 1—Scenario 2
Expenses from Profile 1, Scenario 2=$E_{12}$ $$E_{12} = V_2 P_{A2} J_{A2} S_{x2} U_{x2}$$

$$E_{12} = (44159 \times 10^6 \text{ min.})(0.21)(0.5534)(0.752)$$
$$(0.003193018\text{\$/min.})$$

$$E_{12} = \$12,313,708.00 \quad \quad (9b).$$

Accordingly, the total expense E between scenarios 1 and 2 increased for the given profile ($330,392.00). However, it is not immediately apparent how much the change from each variable influenced the overall change in the total value of the expense $E_1$ for the given profile and for all other profiles. Also, where the two-dimensional case had four possible combinations ($2^2$ combinations) of increasing/decreasing values for each profile, the five-dimensional case leads to 32 ($2^5$) possible combinations. The 32 possible combinations can be organized as follows:

TABLE 2

|  |  | Amount (V) | Prod. Dist. (P) | Juris. Dist. (J) | Supp. Mix (S) | Cost (C) |
|---|---|---|---|---|---|---|
| # of combinations | 1 | + | + | + | + | + |
|  | 1 | − | − | − | − | − |
|  | 10 | + | + | + | − | − |
|  | 10 | − | − | − | + | + |
|  | 5 | + | + | + | + | − |
|  | 5 | − | − | − | − | + |

Thus, applying the principles used in formulae (2), (9a) and (9b), the following can be derived for the profile 1 attribution values reflecting the differences between the two scenarios for that profile $$\Delta E_1 = (V_2 P_{A2} J_{A2} S_{x2} C_{x2}) - (V_1 P_{A1} J_{A1} S_{x1} C_{x1}) \quad (10).$$

Accordingly, the following attributions can be associated with each of the above sources and the interaction effect terms for a five dimensional analysis that includes all variables V, P, J, S, C increasing (denoted by the first row of scenarios illustrated in Table 2):

$$V_V = P_{A1} * J_{A1} * S_{x1} * C_{x1} * \Delta V = u_P u_J u_S u_C \Delta u_V \quad (11);$$

$$V_P = V_1 * J_{A1} * S_{x1} * C_{x1} * \Delta P = u_V u_J u_S u_C \Delta u_P \quad (12);$$

$$V_J = V_1 * P_{A1} * S_{x1} * C_{x1} * \Delta J = u_V u_P u_S u_C \Delta u_J \quad (13);$$

$$V_S = V_1 * P_{A1} * J_{A1} * C_{x1} * \Delta S = u_V u_P u_J u_C \Delta u_S \quad (14);$$

and $$V_C = V_1 * P_{A1} * J_{A1} * S_{x1} * \Delta C = u_V u_P u_J u_S \Delta u_C \quad (15).$$

Additionally, this scenario includes twenty six (26) interaction effect terms, which are additive. In accordance with formula 1c, this interaction can be calculated as follows:

$$I = u_A u_P u_J \Delta_S \Delta_U + u_A u_P u_U \Delta_J \Delta_S + u_A u_S u_U \Delta_P \Delta_J + u_J u_S u_U \Delta_A \Delta_P + \quad (16)$$
$$u_A u_P u_S \Delta_J \Delta_U + u_A u_J u_S \Delta_P \Delta_U + u_P u_J u_S \Delta_A \Delta_U + u_A u_J u_U \Delta_P \Delta_S +$$
$$u_P u_J u_U \Delta_A \Delta_S + u_P u_S u_U \Delta_A \Delta_J + u_A u_P \Delta_S \Delta_U \Delta_J + u_A u_J \Delta_P \Delta_S \Delta_U +$$
$$u_P u_J \Delta_A \Delta_S \Delta_U + u_A u_S \Delta_P \Delta_J \Delta_U + u_P u_S \Delta_A \Delta_J \Delta_U + u_J u_S \Delta_A \Delta_P \Delta_U +$$
$$u_A u_U \Delta_P \Delta_J \Delta_S + u_P u_U \Delta_A \Delta_J \Delta_S + u_J u_U \Delta_A \Delta_P \Delta_S + u_S u_U \Delta_A \Delta_P \Delta_J +$$
$$u_A \Delta_P \Delta_J \Delta_S \Delta_U + u_P \Delta_A \Delta_J \Delta_S \Delta_U + u_J \Delta_A \Delta_P \Delta_S \Delta_U +$$
$$u_S \Delta_A \Delta_P \Delta_J \Delta_U + u_U \Delta_A \Delta_P \Delta_J \Delta_S + \Delta_A \Delta_P \Delta_J \Delta_S \Delta_U.$$

Table 3 below is a compilation of the two sets of values from profile 1 of FIGS. 6 and 7, which were also used in formulas 9a and 9b. For this example, it is assumed that one set of these values is taken from a Plan of Record, which consists of projected values, and the other set is taken from a subsequent forecast. It should be understood, however, that virtually any two sets of values can be used in accordance with the subject invention. It is particularly helpful for the planning and analysis of such expenses to determine how much each source contributed to the change in expenses of $5.87×10^6$ (hereinafter, $10^6$ is denoted by "M"), across all profiles, from what was initially planned to a subsequent forecast.

In a two-dimensional analysis, only two of the above five variables would be compared, with the remaining elements not taken into account or lumped into the interaction terms in the calculation (aliased).

Table 4 shows a comparison of a two-dimensional and a five-dimensional attribution analysis of the $5.87 M difference across all profiles. This example calculates attribution for the difference in expenses between a Plan of Record, which projected expenses of $311.32M, and a subsequent forecast of expenses, which turned out to be $305.45M. The two-dimensional analysis considers only the amount of minutes sold and the Supplier Mix ($S_1$, $S_2$). The two-dimensional analysis uses equations 6a, 6b and 6c to calculate the various attributions. In contrast, the five-dimensional analysis takes both sets of all five elements ($V_1$, $P_1$, $J_1$, $S_1$, $C_1$ and $V_2$, $P_2$, $J_2$, $S_2$, $C_2$) into account. The five-dimensional analysis uses equations 11 through 16 to calculate attribution values for each of the five elements in each of the profiles. Table 5 shows the derivation of the five-dimensional values in Table 4 from each of the profiles.

Table 5 shows the compilation of attribution values to for each of the five variables across each profile for two scenarios of distributions among products, jurisdictions, and suppliers, with fixed unit costs (C). Per equation 1a, the sum of each column provides a total attribution for each element.

TABLE 3

Profile 1: Scenario 1 vs. Scenario 2

| Plan of Record (Projected) | Subsequent Forecast |
|---|---|
| $V_1$ = 44,608 × $10^6$ min. | $V_2$ = 44,159 × $10^6$ min. |
| $P_{A1}$ = 0.209 | $P_{A2}$ = 0.21 |
| $J_{A1}$ = 0.5533 | $J_{A2}$ = 0.5534 |
| $S_{x1}$ = 0.726 | $S_{x2}$ = 0.752 |
| $C_{x1}$ = 0.003193018 $/min. | $C_{x2}$ = 0.003193018 $/min. |

TABLE 4

Summary of Attribution across all Profiles

| Expense Drivers | 2-D Analysis | 5-D Analysis |
|---|---|---|
| $V_V$ (Volumes) | −$2.99 | −$3.13 |
| $V_P$ (Prod. Dist.) | Aliased | −$1.32 |
| $V_J$ (Juris. Dist.) | Aliased | −$2.13 |
| $V_S$ (Supplier Mix) | −$2.73 | $1.00 |
| $V_C$ (Unit Cost) | $0.0 | $0.0 |
| Interaction | −$0.15 | −$0.29 |
| TOTAL | −$5.87 | −$5.87 |

TABLE 5

Attribution Detail

|   |   |   | V | P | J | S | C | I | Total |
|---|---|---|---|---|---|---|---|---|---|
| 1 | $P_A J_A$ | $S_X$ | −0.1206372 | 0.0178394 | 0.0039284 | 0.4330555 | 0 | −0.003794 | $0.33 |
| 2 |   | $S_Y$ | −0.0909168 | 0.0134445 | 0.0029606 | −0.87435779 | 0 | 0.0070687 | $(0.94) |
| 3 |   | $S_Z$ | −0.0053775 | 0.0007952 | 0.0001751 | −0.044784337 | 0 | 0.0003608 | $(0.05) |
| 4 | $J_B$ | $S_X$ | −0.242001 | 0.0357863 | −0.0207954 | 0.768707392 | 0 | −0.0074466 | $0.53 |
| 5 |   | $S_Y$ | −0.4239534 | 0.0626929 | −0.0364307 | −2.272454305 | 0 | 0.021159 | $(2.65) |
| 6 |   | $S_Z$ | −0.0073477 | 0.0010866 | −0.0006314 | −0.093364482 | 0 | 0.0008769 | $(0.10) |
| 7 | $J_C$ | $S_X$ | −0.0228535 | 0.0033795 | 0.003097 | 0.053238767 | 0 | −0.0004461 | $0.04 |
| 8 |   | $S_Y$ | −0.008234 | 0.0012176 | 0.0011158 | −0.098242195 | 0 | 0.0006895 | $(0.10) |
| 9 |   | $S_Z$ | −0.0015082 | 0.000223 | 0.0002044 | −0.012242428 | 0 | 8.464E−05 | $(0.01) |
| 10 | $P_B J_A$ | $S_X$ | −0.0850022 | 0.012641 | 0.0026969 | −0.02220009 | 0 | 3.315E−05 | $(0.09) |
| 11 |   | $S_Y$ | −0.0500172 | 0.0074382 | 0.0015869 | −0.073420318 | 0 | 0.0005186 | $(0.11) |
| 12 |   | $S_Z$ | −0.0306603 | 0.0045596 | 0.0009728 | 0.11014853 | 0 | −0.000965 | $0.08 |
| 13 | $J_B$ | $S_X$ | −0.1549722 | 0.0230465 | −0.0134463 | 0.685427641 | 0 | −0.0065946 | $0.53 |
| 14 |   | $S_Y$ | −0.2143095 | 0.0318708 | −0.0185947 | −0.836634296 | 0 | 0.0077458 | $(1.03) |
| 15 |   | $S_Z$ | −0.0682292 | 0.0101466 | −0.00592 | −0.510592336 | 0 | 0.0047743 | $(0.57) |
| 16 | $P_C J_A$ | $S_X$ | −0.0077848 | 0.0199905 | 0.0044475 | −0.22062748 | 0 | −0.0048458 | $(0.21) |
| 17 | $J_B$ | $S_X$ | −0.0247388 | 0.0635267 | −0.0162361 | −0.700557902 | 0 | −0.0070666 | $(0.69) |
| 18 | $J_C$ | $S_X$ | −0.001335 | 0.0034282 | 0.0001319 | −0.037936378 | 0 | −0.0006597 | $(0.04) |
| 19 | $P_D J_A$ | $S_X$ | −0.0415825 | 0.1070652 | 0.0234765 | −0.020098053 | 0 | −0.0011412 | $0.07 |
| 20 |   | $S_Y$ | −0.0232887 | 0.0599629 | 0.0131482 | 0.042281566 | 0 | 0.0005047 | $0.09 |
| 21 |   | $S_Z$ | −0.0158444 | 0.0407956 | 0.0089454 | 0.021442042 | 0 | 0.0001869 | $0.06 |
| 22 | $J_B$ | $S_X$ | −0.0929141 | 0.239232 | −0.061597 | 0.788679702 | 0 | 0.0035829 | $0.88 |
| 23 |   | $S_Y$ | −0.064164 | 0.1652073 | −0.0425373 | −0.240066103 | 0 | −0.0044424 | $(0.19) |
| 24 |   | $S_Z$ | −0.0842921 | 0.2170325 | −0.0558811 | −0.847770597 | 0 | −0.0105288 | $(0.78) |
| 25 | $P_E J_A$ | $S_X$ | −0.0925599 | −0.255709 | 0.1871444 | 0.307860409 | 0 | −0.0100066 | $0.14 |
| 26 |   | $S_Y$ | −0.1033289 | −0.2854599 | 0.208918 | −0.791475459 | 0 | 0.0092729 | $(0.96) |
| 27 |   | $S_Z$ | −0.027392 | −0.0756741 | 0.0553832 | 0.127253268 | 0 | −0.0036123 | $0.08 |
| 28 | $J_B$ | $S_X$ | −0.1707 | −0.4715817 | −0.6232213 | −1.276082939 | 0 | 0.1212976 | $(2.42) |
| 29 |   | $S_Y$ | −0.3037806 | −0.8392345 | −1.1090948 | 7.558019812 | 0 | −0.5013713 | $4.80 |
| 30 |   | $S_Z$ | −0.0563704 | −0.1557308 | −0.2058068 | −1.616368148 | 0 | 0.1272548 | $(1.91) |
| 31 | $P_F J_A$ | $S_X$ | −0.0575788 | −0.0485656 | 0.0391401 | 0.346060714 | 0 | −0.0043024 | $0.27 |
| 32 |   | $S_Y$ | −0.0536555 | −0.0452565 | 0.0364732 | −1.049347526 | 0 | 0.012118 | $(1.10) |
| 33 |   | $S_Z$ | −0.0189999 | −0.0160257 | 0.0129155 | 0.070569424 | 0 | −0.0009069 | $0.05 |
| 34 | $J_B$ | $S_X$ | −0.1214192 | −0.1024127 | −0.1336502 | −0.269915964 | 0 | 0.0114217 | $(0.62) |
| 35 |   | $S_Y$ | −0.1815437 | −0.1531255 | −0.1998312 | 2.890335947 | 0 | −0.0795965 | $2.28 |
| 36 |   | $S_Z$ | −0.0450006 | −0.0379564 | −0.0495337 | −1.282178451 | 0 | 0.0389282 | $(1.38) |
| 37 | $P_G J_A$ | $S_X$ | −0.0036648 | 0.0042975 | −0.0092265 | −0.001980311 | 0 | −1.114E−05 | $(0.01) |
| 38 |   | $S_Y$ | −0.002053 | 0.0024075 | −0.0051686 | 0.00379401 | 0 | −0.0001228 | $(0.00) |
| 39 |   | $S_Z$ | −0.0013981 | 0.0016395 | −0.0035198 | 0.002175809 | 0 | −7.392E−05 | $(0.00) |
| 40 | $J_B$ | $S_X$ | −0.004874 | 0.0057155 | −0.0501148 | 0.041016369 | 0 | −0.0043248 | $(0.01) |
| 41 |   | $S_Y$ | −0.0033676 | 0.0039491 | −0.0346263 | −0.01282051 | 0 | 0.0012126 | $(0.05) |
| 42 |   | $S_Z$ | −0.0044269 | 0.0051912 | −0.0455171 | −0.04389156 | 0 | 0.0043535 | $(0.08) |
| TOTAL ATTRIBUTION |   |   | $(3.13) | $(1.32) | $(2.13) | $1.00 |   | $(0.29) | $(5.87) |

Note from Table 4 how the two-dimensional analysis attributes significantly more influence to the change in the supplier mix. The five-dimensional analysis provides a more accurate picture of how the variables contributed to the changes since drivers are no longer aliased. From the above table we see that without the benefit of the present invention, none of the change driven by Product or Jurisdiction would be attributed to those drivers. Rather, the entire difference would be attributed to volume level and supplier, and the impact of supplier mix would be overstated and directionally wrong.

The method and system of the present invention can readily be applied to Financial analysis applications where there is a need to explain why revenues or expenses have changed between two points in time. Applications include understanding revenue or expense history as well as the causes for deviations between forecasts and actual business record reports (i.e., book-close packages). Additionally the method and system of the present invention can be applied to alerting/anomaly identification in large scale data mining. For example, in applications where revenue is a function of volumes, price, customer, state, jurisdiction etc, such as 'revenue alerting', 'Bill validation', fraud detection etc.

It is understood that the systems, functions, methods, steps and calculations described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product or computer-readable medium, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The term computer readable medium is any data storage device that can store data, which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Thus, while the preferred embodiments of the present invention have been described with reference to the accompanying drawings, it is to be understood that the invention is not limited to those precise embodiments and that various other changes and modifications to the invention may be affected by one skilled in the art without departing from the scope or spirit of the invention, and that it is intended to claim all such changes and modifications that fall within the scope of the invention.

What is claimed is:

1. A method of determining an attribution value to adjust the distribution of telecommunications services, the method comprising:
   compiling values, by a processing device, for at least three variable elements associated with the distribution of telecommunication services, the at least three variable elements including at least one of a number of units, a type of product, a jurisdiction, a supplier and a unit cost, wherein said compiling values includes a first total value being a product of first element values associated with the at least three variable elements, a second total value being a product of second element values associated with the at least three variable elements;
   determining, by the processing device, an attribution value representing an amount of influence at least one of the three variable elements has on a difference between the first and the second total values, the attribution value being determined using the first and second total values; and
   selectively adjusting the distribution of telecommunication services based on the attribution value, the attribution value including a total attribution value $A_T$ determined using $$A_T = \sum_{j=1}^{P} A_j,$$

wherein P represents a number of profiles associated with the at least three variable elements and j represents a profile from 1 to P.

2. A method as defined by claim 1, wherein the attribution value includes a profile attribution value determined using:

$$A_j = (u_1 u_2 \ldots u_{n-1})\Delta u_n + (u_1 u_2 \ldots u_{n-2} u_n)\Delta u_{n-1} + \ldots + (u_1 u_3 \ldots )\Delta u_2 + (u_2 \ldots u_n)\Delta u_1 + I,$$

wherein $u_i$ represents a value corresponding to individual variable elements, a subscript i ranges from 1 to n, n represents total number of variable elements, and I represents the attribution value due to an interaction of n variables.

3. A method as defined by claim 2, wherein the attribution value for the interaction of the n variables is determined using:

$$I = u_1 u_2 \ldots u_{n-2}\Delta u_{n-1}\Delta u_n + u_1 u_2 \ldots u_{n-3}\Delta u_{n-2}\Delta u_{n-1} u_n + \ldots + u_1 \Delta u_2 \Delta u_3 u_4 \ldots u_n + \Delta u_1 \Delta u_2 u_3 \ldots u_n + u_1 u_2 \ldots u_{n-3}\Delta u_{n-2}\Delta u_{n-1}\Delta u_n + u_1 u_2 \ldots u_{n-4}\Delta u_{n-3}\Delta u_{n-2}\Delta u_{n-1} u_n + \ldots + u_1 \Delta u_2 \Delta u_3 \Delta u_4 u_5 \ldots u_n + \Delta u_1 \Delta u_2 \Delta u_3 u_4 \ldots u_n + \ldots + \Delta u_1 \Delta u_2 \ldots \Delta u_n.$$

4. A method as defined by claim 1, wherein at least one of the first and second total values represents at least one of forecast distribution expenses, realized distribution expenses, and distribution expenses and revenues in different time periods.

5. A method as defined by claim 1, wherein determining the attribution value includes determining the attribution value representing the amount of influence of the at least three variable elements have on the difference between the first and second values.

6. A system for determining an attribution value to adjust the distribution of telecommunications services, the system comprising:
   a computing device configured to determine an attribution value to adjust the distribution of telecommunications services, the computing device compiling values for at least three variable elements associated with distribution of telecommunication services, the at least three variable elements including at least one of a number of units, a type of product, a jurisdiction, a supplier and a unit cost, wherein said compiling values includes a first total value being a product of first element values associated with the at least three variable elements and a second total value being a product of second element values associated with the at least three variable elements, the attribution value representing an amount of influence at least one of the three variable elements has on a difference between the first and the second total values, the attribution value being determined using the first and second total values, the distribution of telecommunication services being selectively adjusted based on the attribution value, the attribution value including a total attribution value $A_T$ determined using $$A_T = \sum_{j=1}^{P} A_j,$$

wherein P represents a number of profiles associated with the at least three variable elements and j represents a profile from 1 to P.

7. The system as defined by claim 6, wherein the attribution value includes a profile attribution value determined using:

$$A_j = (u_1 u_2 \ldots u_{n-1})\Delta u_n + (u_1 u_2 \ldots u_{n-2} u_n)\Delta u_{n-1} + \ldots + (u_1 u_3 \ldots )\Delta u_2 + (u_2 \ldots u_n)\Delta u_1 + I,$$

wherein $u_i$ represents a value corresponding to individual variable elements, a subscript i ranges from 1 to n, n represents total number of variable elements, and I represents the attribution value due to an interaction of n variables.

8. The system as defined by claim 7, wherein the attribution value for the interaction of the n variables is determined using:

$$I = u_1 u_2 \ldots u_{n-2} \Delta u_{n-1} \Delta u_n + u_1 u_2 \ldots u_{n-3} \Delta u_{n-2} \Delta u_{n-1} u_n + \ldots +$$
$$u_1 \Delta u_2 \Delta u_3 u_4 \ldots u_n + \Delta u_1 \Delta u_2 u_3 \ldots u_n + u_1 u_2 \ldots u_{n-3} \Delta u_{n-2} \Delta u_{n-1} \Delta u_n +$$
$$u_1 u_2 \ldots u_{n-4} \Delta u_{n-3} \Delta u_{n-2} \Delta u_{n-1} u_n + \ldots + u_1 \Delta u_2 \Delta u_3 \Delta u_4 u_5 \ldots u_n +$$
$$\Delta u_1 \Delta u_2 \Delta u_3 u_4 \ldots u_n + \ldots + \Delta u_1 \Delta u_2 \ldots \Delta u_n.$$

9. The system as defined by claim 6, wherein at least one of the first and second total values represents at least one of forecast distribution expenses, realized distribution expenses, and distribution expenses and revenues in different time periods.

10. The system as defined by claim 6, wherein determining the attribution value includes determining the attribution value representing the amount of influence of the at least three variable elements have on the difference between the first and second values.

11. A non-transitory computer-readable medium storing instructions, wherein execution of the instructions by at least one computing device determines an attribution value to adjust the distribution of telecommunications services by:
  compiling values for at least three variable elements associated with the distribution of telecommunication services, the at least three variable elements including at least one of a number of units, a type of product, a jurisdiction, a supplier and a unit cost, wherein said compiling values includes a first total value being a product of first element values associated with the at least three variable elements, a second total value being a product of second element values associated with the at least three variable elements;
  determining an attribution value representing an amount of influence at least one of the at least three variable elements has on a difference between the first and the second total values, the attribution value being determined using the first and second total values; and
  selectively adjusting the distribution of telecommunication services based on the attribution value, the attribution value includes a total attribution value $A_T$ determined using $$A_T = \sum_{j=1}^{P} A_j,$$

wherein P represents a number of profiles associated with the at least three variable elements and j represents a profile from 1 to P.

12. A non-transitory computer-readable medium comprising instructions defined by 11, wherein the attribution value includes a profile attribution value determined using:

$$A_j = (u_1 u_2 \ldots u_{n-1}) \Delta u_n + (u_1 u_2 \ldots u_{n-2} u_n) \Delta u_{n-1} +$$
$$\ldots + (u_1 u_3 \ldots ) \Delta u_2 + (u_2 \ldots u_n) \Delta u_1 + I,$$

wherein $u_i$ represents a value corresponding to individual variable elements, a subscript i ranges from 1 to n, n represents total number of variable elements, and I represents the attribution value due to an interaction of n variables.

13. A non-transitory computer-readable medium comprising instructions defined by 12, wherein the attribution value for the interaction of the n variables is determined using:

$$I = u_1 u_2 \ldots u_{n-2} \Delta u_{n-1} \Delta u_n + u_1 u_2 \ldots u_{n-3} \Delta u_{n-2} \Delta u_{n-1} u_n + \ldots +$$
$$u_1 \Delta u_2 \Delta u_3 u_4 \ldots u_n + \Delta u_1 \Delta u_2 u_3 \ldots u_n + u_1 u_2 \ldots u_{n-3} \Delta u_{n-2} \Delta u_{n-1} \Delta u_n +$$
$$u_1 u_2 \ldots u_{n-4} \Delta u_{n-3} \Delta u_{n-2} \Delta u_{n-1} u_n + \ldots + u_1 \Delta u_2 \Delta u_3 \Delta u_4 u_5 \ldots u_n +$$
$$\Delta u_1 \Delta u_2 \Delta u_3 u_4 \ldots u_n + \ldots + \Delta u_1 \Delta u_2 \ldots \Delta u_n.$$

14. A non-transitory computer-readable medium storing instructions defined by 11, wherein at least one of the first and second total values represents at least one of forecast and realized distribution expenses.

* * * * *